Figure 1:
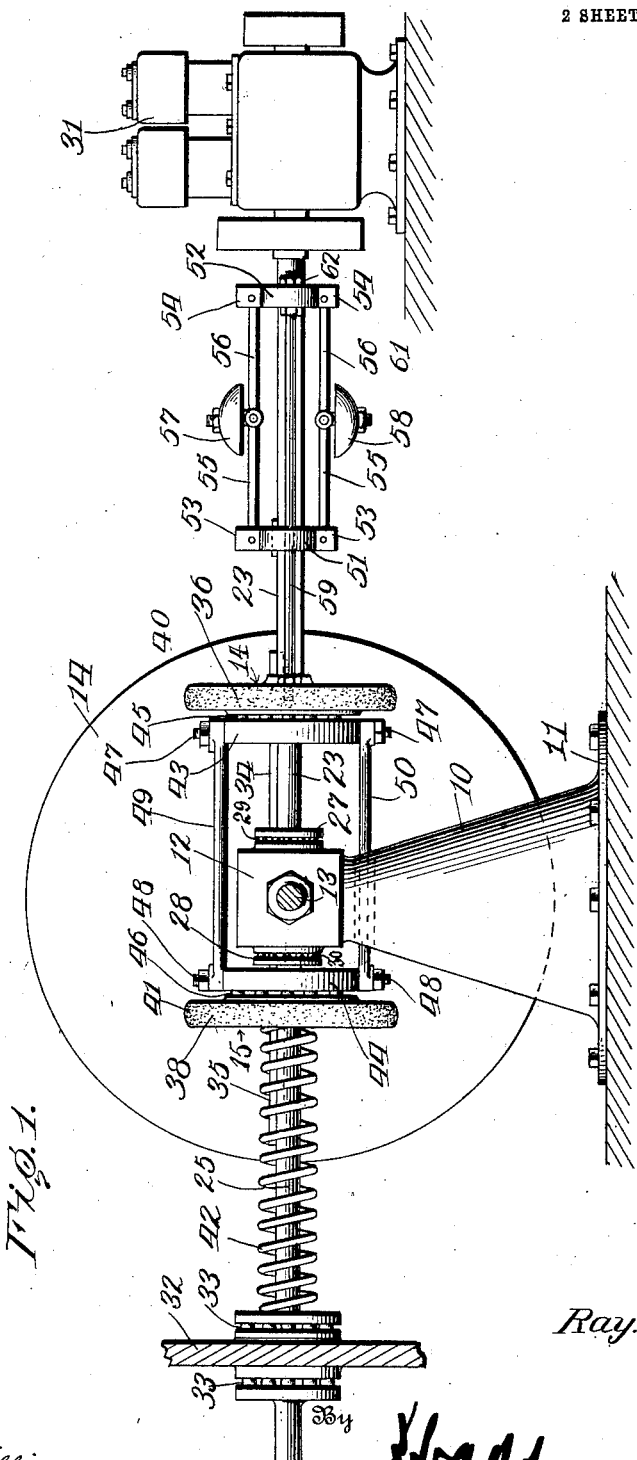

R. E. KELLOGG.
GEARING.
APPLICATION FILED MAY 5, 1911. RENEWED OCT. 30, 1913.

1,094,216.

Patented Apr. 21, 1914.

2 SHEETS—SHEET 1.

Witnesses
W. N. Woodson.
Juana M. Fallin.

Inventor
Ray. E. Kellogg
By
H. A. Stacey, Attorneys.

COLUMBIA PLANOGRAPH CO., WASHINGTON, D. C.

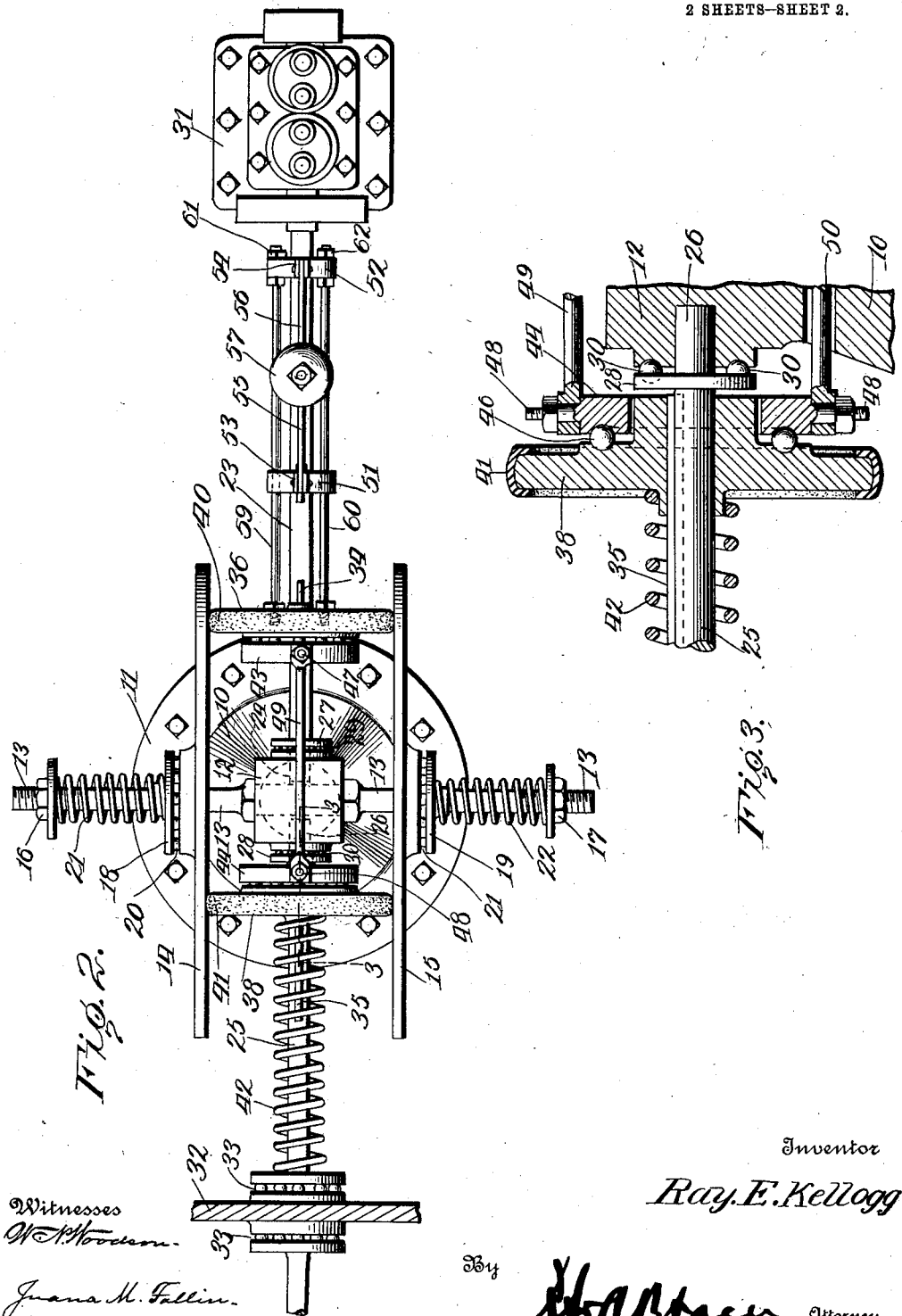

UNITED STATES PATENT OFFICE.

RAY E. KELLOGG, OF INDIO, CALIFORNIA.

GEARING.

1,094,216.  Specification of Letters Patent.  Patented Apr. 21, 1914.

Application filed May 5, 1911, Serial No. 625,162. Renewed October 30, 1913. Serial No. 798,330.

*To all whom it may concern:*

Be it known that I, RAY E. KELLOGG, citizen of the United States, residing at Indio, in the county of Riverside and State of California, have invented certain new and useful Improvements in Gearing, of which the following is a specification.

This invention relates to improvements in governing devices for automatically controlling the speeds of aeroplanes, motor boats, automobiles, and the like, and has for one of its objects to simplify and improve the construction and increase the efficiency and utility of a device of this character.

Another object of the invention is to provide a device of this character, whereby the employment of shifting levers for changing the speed is dispensed with and the consequent shock and irregularities occasioned by the use of the shifting levers is avoided.

Another object of the invention is to provide a device of this character whereby greater power is generated in starting and higher speed acquired when comparatively little resistance is encountered.

For a full understanding of the invention reference is to be had to the following description and accompanying drawings, in which:—

Figure 1 is a side elevation of the improved device partly in section. Fig. 2 is a plan view of the improved device with the governor portion arranged in position to indicate high speed. Fig. 3 is an enlarged sectional detail on the line 3—3 of Fig. 2.

Corresponding and like parts are referred to in the following description and indicated in all the views of the accompanying drawings by the same reference characters.

The improved device may be applied as before stated to various motor driven devices and it is not desired therefore to limit the invention to use upon any specific mechanism or structure.

The improved device comprises in general a supporting base or standard 10 having means such as a lateral flange 11 for securing the same to the bottom of a boat, the framework of an aeroplane, the framework of an automobile, or other mechanism with which it is employed, and the foot of the base will be varied to suit the structure to which it is attached. At its upper end the base 10 is provided with a head 12 through which a shaft 13 is rigidly secured in any suitable manner and extending at its ends laterally from opposite sides of the head. Mounted for rotation upon the shaft 13 at opposite sides of the head are friction wheels or disks 14—15, the friction wheels being thus spaced apart and with their operating faces inwardly, as shown. At its outer ends the shaft 13 is threaded and provided with adjusting nuts 16—17, and surrounding the shaft outside of each of the friction wheels are bearing collars 18—19, the collars having anti-friction balls 20—21 between them and the friction wheels. The bearing nuts 16—17 are formed with bearing flanges, and surrounding the shaft 13 between the bearing sleeves 18—19 and the nuts 16—17 are springs 21—22, the springs thus operating to maintain the friction wheels yieldable in their inward positions, as hereafter explained.

The driving shaft of the improved device is represented at 23 and stepped at its inner end in a suitable bearing 24 in the head 12, while the driven-shaft represented at 25 is similarly stepped at 26 in the opposite side of the head as shown. The shaft 23 is provided with a bearing collar 27, while the shaft 25 is provided with a similar bearing collar 28, the bearing collars being provided respectively with bearing balls 29—30 to reduce the friction. At its outer end the shaft 23 is coupled to the motor represented conventionally at 31, while the shaft 25 is supported by a suitable bearing member or standard 32. The standard 32 is provided with suitable ball-bearings 33 to reduce the friction. The driven-shaft 25 may be connected to any of the various mechanisms but as the driven mechanism forms no part of the present invention, it is not illustrated.

The shaft 23 is provided with a longitudinal spline or key 34, while the shaft 25 is provided with a similar key 35. Mounted upon the shaft 23 is a friction pinion 36 having a keyway engaging with the key 34, while the shaft 25 is provided with a similar friction pinion 38 having a keyway engaging with the key 35. By this means it will be obvious that the pinions are slidably engaged respectively with the shafts 23—25 and likewise partaking of their rotary motion. The pinions 36—38 are provided with suitable yieldable sheathing such as leather, rubber, fiber, or the like, and indicated respectively at 40—41, the yieldable sheathing operating against the confronting faces of the friction-wheels. Surrounding the shaft 25 between the bearing 33 and the pinion 36 is a coil spring 42. Surrounding the hub of the friction pinion 36 is an annular bearing member 43, while a similar annular bearing member 44 is arranged to surround the hub of the friction pinion 38, the bearing members 43—44 being provided with bearing balls 45—46 respectively, as shown. The annular member 43 is provided with oppositely extending trunnions or pins 47 while the member 46 is provided with pins or trunnions 48, the trunnions serving as means for coupling tie-rods 49—50 to the annular members, to thereby couple the annular members together, the object to be hereafter explained.

A suitable governor device is associated with the driving shaft 23 and comprises a sleeve 51 rigidly coupled to the shaft and another similar sleeve 52 slidable upon the shaft. The sleeves 51—52 are provided respectively with spaced ears 53—54 upon opposite sides and mounted to swing in these sleeves are link-bars 55—56. At their inner ends the link-bars are pivotally coupled to weights 57—58. Secured at one end in the friction pinion 36 are rods 59—60, the rods extending through suitable apertures in the sleeve 51 and threaded at their outer ends and extending through similar apertures in the sleeve 52 and provided with adjusting nuts 61—62 operating upon opposite sides of the sleeve 52. By this means the sleeve 52 may be adjusted relative to the rods 59—60 and the pinion 36 and the sleeve 52 coupled to move together upon the shaft 23. It will be noted that the lower coupling member 50 passes through the standard 10 below the head 12. Thus by employing the annular members 43—44, the latter are retained in stationary position, while the pinions and shafts are rotated, but by reason of the ball-bearings 45—46 the friction between the parts is materially reduced. By this simple arrangement it will be obvious that when the speed increases the centrifugal force will distend the weights 57—58 of the governor and draw the sleeve 52 toward the sleeve 51 and through the operation of the coupling rods 59—60 will move the friction pinion 36 toward the shaft 13, thus reducing the speed of the friction wheels 14—15, while at the same time through the action of the coupling rods 49—50 the pinion 38 is moved away from the shaft 13 a corresponding distance and thus equalizing the speed imparted to the shaft 25. Thus any variation in the speed of the motor causes a corresponding variation in the positions of the wheels of the gearing, the friction pinions standing in position to impart the full power of the motor to the drive-shaft whether running on the level or up an incline at full speed or at starting. The friction wheels 14—15 are preferably of steel or like metal, while the bearing surfaces 40—41 being of yieldable material operate with the minimum degree of "slip" and wear. The sheathing 40—41 being relatively inexpensive and easily applied may be renewed when worn without discarding the remaining or more expensive portions of the apparatus.

The improved device is simple in construction, may be manufactured of any suitable material and any required size and attached without material structural changes to any of the various machines, devices, or apparatus requiring an automatic speed regulating device.

Having thus described the invention what is claimed as new is:—

1. A driving shaft, a driven shaft, a friction wheel, a friction pinion slidable upon said driving shaft and partaking of its motion and engaging said friction wheel, another friction pinion slidable upon said driven shaft and partaking of its motion and engaging said friction wheel, means for coupling said friction pinions to move together, and a speed-governor connected to said driving shaft and to the sliding friction pinion upon the same.

2. A supporting standard, a driving shaft extending from said standard, a driven shaft extending from said standard, friction wheels mounted for rotation upon said standard and spaced apart, a friction pinion slidable upon said driving shaft and partaking of its motion and engaging said friction wheels, another friction pinion slidable upon said driven shaft and partaking of its motion and engaging said friction wheels, means for coupling said friction pinions to move together, and a speed governor connected to said driving shaft and to the sliding friction pinion upon the same.

3. A supporting standard, a shaft extending transversely of said standard, a driving shaft and a driven shaft mounted for independent rotation in said standard, friction wheels mounted for rotation upon said transverse shaft and spaced apart, a friction pinion slidable upon said driving shaft and partaking of its motion and engaging said friction wheels, another friction pinion slidable upon said driven shaft and partaking of its motion and engaging said friction wheels, means for coupling said friction pinions to move together, and a speed governor connected to said driving shaft and to the sliding friction pinion upon the same.

4. A driving shaft, a driven shaft, a friction wheel, a friction pinion slidable upon said driving shaft and partaking of its motion and engaging said friction wheel, another friction pinion slidable upon said driven shaft and partaking of its motion and engaging said friction wheel, an annular bearing member operatively engaging each of said friction pinions, tie rods connecting said bearing members, a spring bearing against one of said friction pinions, and a speed governor connected to said other friction pinion and to the driving shaft.

5. A driving shaft, a driven shaft, a friction wheel, a friction pinion slidable upon said driving shaft and partaking of its motion and engaging said friction wheel, another friction pinion slidable upon said driven shaft and partaking of its motion and engaging said friction wheel, tie rods connecting said friction pinions to cause them to move together, and a speed governor connected to said driving shaft and to the sliding friction pinion upon the same.

6. A driving shaft, a driven shaft, a friction wheel, a friction pinion slidable upon said driving shaft and partaking of its motion and engaging said friction wheel, another friction pinion slidable upon said driven shaft and partaking of its motion and engaging said friction wheel, tie rods connecting said friction pinions to cause them to move together, means for moving said slidable pinion upon said driving shaft.

7. A driving shaft, a driven shaft, a friction wheel, a friction pinion slidable upon said driving shaft and partaking of its motion and engaging said friction wheel, another friction pinion slidable upon said driven shaft and partaking of its motion and engaging said friction wheel, an annular bearing member operatively engaging each of said friction pinions, tie rods connecting said bearing members, a spring bearing against one of said friction pinions, and means for moving said slidable pinion upon said driving shaft.

8. A supporting standard, a driving shaft extending from said standard, a driven shaft extending from said standard, friction wheels mounted for rotation upon said standard and spaced apart, a friction pinion slidable upon said driving shaft and partaking of its motion and engaging said friction wheels, another friction pinion slidable upon said driven shaft and partaking of its motion and engaging said friction wheels, means for coupling said friction pinions to move together, and means for moving said slidable pinion upon said driving shaft.

9. A supporting standard, a shaft extending transversely of said standard, a driving shaft and a driven shaft mounted for independent rotation in said standard, friction wheels mounted for rotation upon said transverse shaft and spaced apart, a friction pinion slidable upon said driving shaft and partaking of its motion and engaging said friction wheels, another friction pinion slidable upon said driven shaft and partaking of its motion and engaging said friction wheels, means for coupling said friction pinions to move together, and means for moving said slidable pinion upon said driving shaft.

In testimony whereof, I affix my signature in presence of two witnesses.

RAY E. KELLOGG. [L. S.]

Witnesses:
T. F. GREEN,
C. P. BELL.